W. O. REW.
DESICCATOR.
APPLICATION FILED APR. 17, 1918.
1,392,656.
Patented Oct. 4, 1921.
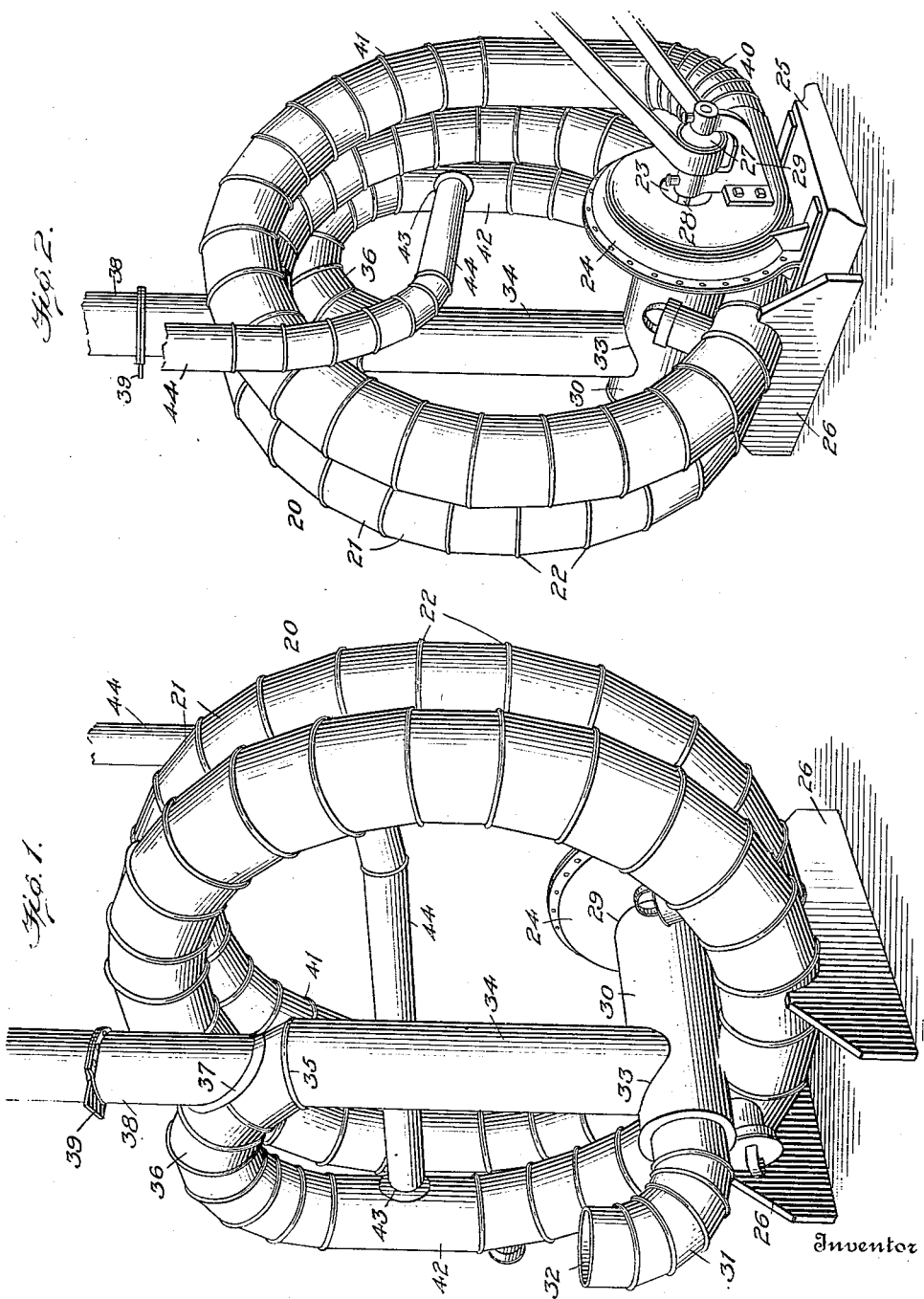
Inventor
William O. Rew
By Church T ......
his Attorneys

UNITED STATES PATENT OFFICE.

WILLIAM O. REW, OF EUREKA, CALIFORNIA, ASSIGNOR TO CALIFORNIA CENTRAL CREAMERIES, OF SAN FRANCISCO, CALIFORNIA, A CORPORATION OF CALIFORNIA.

DESICCATOR.

1,392,656. Specification of Letters Patent. Patented Oct. 4, 1921.

Application filed April 17, 1918. Serial No. 229,076.

*To all whom it may concern:*

Be it known that I, WILLIAM O. REW, a citizen of the United States, residing at Eureka, in the county of Humboldt and State of California, have invented certain new and useful Improvements in Desiccators; and I do hereby declare the following to be a full, clear, and exact description of the same, reference being had to the accompanying drawings, forming part of this specification.

This invention relates to machines for desiccating moist solids and has particular reference to the drying and finely pulverizing of the milk particles which are formed in the action of milk desiccators of the usual type.

The object of this invention is to provide a machine which will thoroughly dry these moist particles and at the same time reduce them to a fine powder, thus rendering the product of the machine suitable for mixing with the first run desiccated milk from the principal machine, the machine of this invention being purely an auxiliary device.

A further object of the invention is to provide a machine that will perform the dual function of drying and pulverizing the sticky lumps of milk formed in the usual desiccator, and will, due to the attrition at the sharp corners where the tube changes its angle, permit the discharge of the finely powdered milk through the non-centrifugal vent while the lumps not yet sufficiently finely divided will be thrown past such discharge vent by centrifugal action.

In the drawings:

Figure 1 is a perspective view of the device as seen from the intake side; and

Fig. 2 is a similar view but taken from the blower side of the apparatus.

Referring now to the drawings, 20 represents a curved tube or pipe of comparatively large cross section and formed of a number of metal cylindrical sections 21, 21 joined as at 22, so as to form sharp edges on the inside of the tube, the solder being on the outside of the tube. This tube, together with the several other parts of the apparatus forms a closed air circuit in which the milk particles are rapidly whirled by the centrifugal fan 23 in casing 24 mounted on support 25 located between the vertical wooden supports 26, 26 for the curved piping 1. Power is supplied to the centrifugal blower fan by means of a pulley wheel 27 mounted on shaft 28 journaled in bracket 29 secured to the fan casing, the fan itself being also secured to the shaft or axle 28.

The eye of the blower fan is joined to a comparatively large horizontal section 30 having an entrance elbow 31 opening as at 32 for receiving the moist particles from the principal machine, and being joined as at 33 to a vertical pipe 34 joined at its upper end 35 to one of the bends 36 of the curved tube. This bend is joined as at 37 near the joint 35 to the vertical pipe 38 provided with valve 39 and leading from the hot air heater and providing the necessary heat for thoroughly drying the milk particles.

The blower end of the fan is connected to the curved tube by means of an elbow 40 with the first helix 41 of the curved tube. As shown in the drawing there are three of these helices, the last of which is provided with a straight section 42 in the center of which on the inner side of the helix is an exit opening 43 to which is joined the discharge pipe 44 which leads to the receptacle (not shown) for holding the finished product, the receptacle being preferably located at a higher level than the auxiliary machine here shown. It is preferable to have a slight suction in the discharge pipe 44 to withdraw the finely ground and thoroughly dried product.

In operation, the moist particles are dumped into the mouth 32 from whence it is drawn into the horizontal section 30, the fan also drawing the hot air down through the pipe 38, both the hot air and the moist product passing through the eye of the fan and being discharged at the periphery into the curved tube through the elbow 40 and is then whirled through the tube, becoming finely pulverized on account of the attrition against the sharp edges of the joints of the sections of the various helices. As the stream of particles passes the exit opening 43 the still unground particles are directed by centrifugal action to the outer edge of the helix, while the particles sufficiently finely ground not being acted upon by the centrifugal force pass close to the exit opening and are drawn into the discharge pipe by the suction in the receiving chamber above. The milk particles continue to revolve around and around through the series of helices until they are reduced to a powder fine enough to float past the exit opening, as stated.

What I claim is:

1. In a desiccator, the combination with an endless closed air circuit including a curved line of piping and a pump for circulating fluid in said circuit, of an inlet to said circuit, and an exit opening in the inner wall of the curved piping.

2. In a desiccating apparatus, a closed air circuit including a curved attrition element composed of a plurality of intersecting cylindrical portions, suction means for drawing matter through said element, and a plurality of ducts leading to the circuit.

3. In a desiccator, an endless closed air circuit including a curved attrition element, a blower fan for creating a current of air through such circuit, and entrance pipe opening to the circuit, a second entrance pipe spaced from said first mentioned pipe, and an exit pipe leading from the system on the opposite side of the fan.

4. In a desiccating apparatus, a series of helical pipes, means for forcing matter through said series of piping, and an exit member opening into said piping on the inner side of one of said helices.

5. In a desiccating apparatus, a series of attrition elements forming an endless closed circuit, means for forcing matter through said circuit, and means whereby the temperature in said circuit may be maintained at any desired degree.

6. In a desiccating apparatus, a closed air circuit having interior attrition edges, an entrance pipe for milk particles, an entrance pipe for heated air and means for passing the heated air and milk particles continuously through the closed air circuit always in the one direction.

7. In a desiccating apparatus, a helical, closed air circuit, an entrance pipe, an exit pipe leading from said circuit, means for causing a continual current of fluid in said circuit and attrition members within said helical circuit for causing particles of milk placed in the system to be ground so fine as to avoid the centrifugal force present in the system.

8. In a milk desiccating apparatus, an attrition element composed of a helix built up from a plurality of cylindrical portions, whereby a plurality of obtuse angle joints are formed.

9. In a device for drying and pulverizing lumps of partly dried milk, a helix of piping having interior attrition edges, a blower at one end of said helix, a vertical pipe connected to the other end of said helix, and a horizontal pipe connecting said vertical pipe and said blower to form a closed circuit including the helix and blower.

10. In a device for pulverizing moist particles of milk, a helix of a plurality of turns of piping formed of cylindrical portions, a blower for causing a current of air in said helix, an entrance pipe leading to said helix for milk particles, and an exit pipe for said particles located on the inside of one of the turns of said helix.

11. A device of the character described consisting of a receptacle, a helical pipe having disintegrating projections connected therewith and having an exit opening in one side thereof, a heating supply leading into said helical pipe, a blower connected with said helical pipe and said receptacle and a discharge pipe leading from the exit opening in the side of the said helical pipe.

WILLIAM O. REW.